E. F. Wilder,

Oil Can.

No. 4,176. Reissued Nov. 8. 1870.

Witnesses,

J. S. Brown.

D. J. Brown

Eli F. Wilder.

N. PETERS, PHOTO-LITHOGRAPHER, WASHINGTON, D. C.

UNITED STATES PATENT OFFICE.

ELI F. WILDER, OF LOWELL, MASSACHUSETTS.

IMPROVEMENT IN DRIP-FILTERING OIL-FOUNTAINS.

Specification forming part of Letters Patent No. 101,069, dated March 22, 1870; antedated September 22, 1869; Reissue No. 4,176, dated November 8, 1870.

*To all whom it may concern:*

Be it known that I, ELI F. WILDER, of Lowell, in the county of Middlesex and State of Massachusetts, have invented an Improved Apparatus for Containing and Drawing Liquids; and I do hereby declare that the following is a full and exact description thereof, reference being had to the accompanying drawings, making part of this specification—

Figure 1:
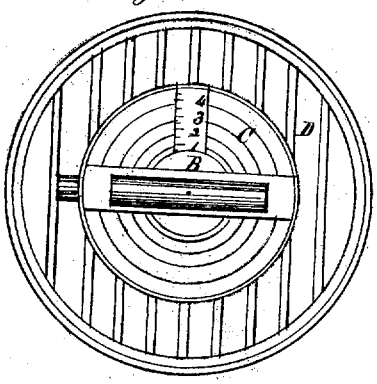
Figure 2:
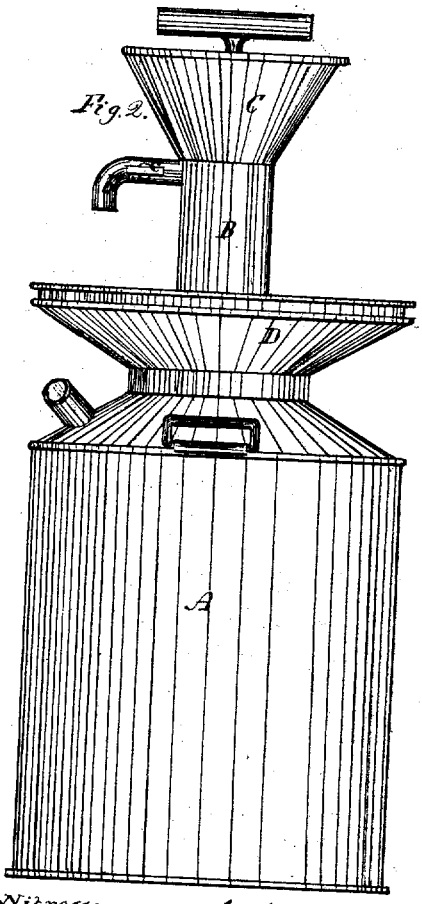
Figure 3:
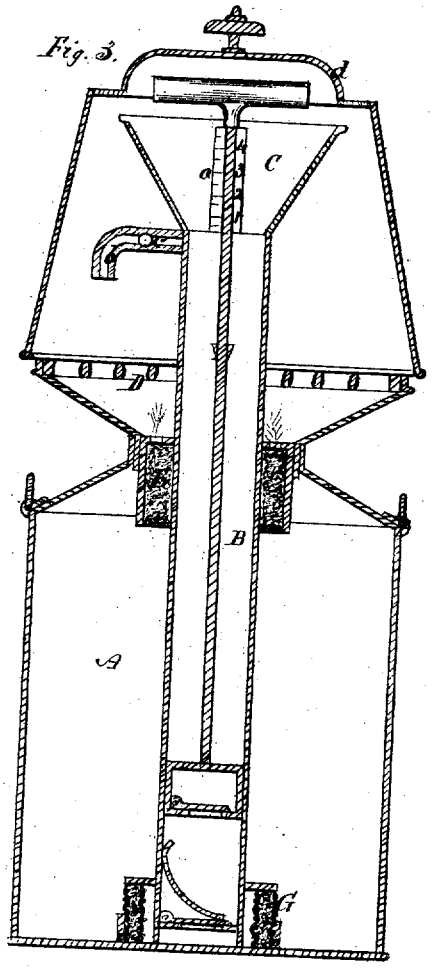

Figure 1 being a plan of apparatus embodying my improvements; Fig. 2, a side elevation of the same; Fig. 3, a central vertical section thereof.

Like letters designate corresponding parts in all of the figures.

The nature of my invention consists in an improved apparatus for containing and drawing oils and other liquids capable of returning the drip or overflow to the tank or reservoir, and of filtering the same, as well as the liquid, when drawing, and also of measuring the liquid in the act of drawing.

Let A represent a tank, can, or other reservoir for containing a supply of oil or other liquids kept on hand, to be of any desired construction.

A pump, B, is placed in this tank or reservoir, reaching nearly to the bottom within the same, and extending upward therefrom to the desired height.

At the top of the pump is a chamber, C, to serve as a standing fountain for holding a quantity of the liquid when pumped up from the tank or reservoir. This may be of any desired form.

If it is desired to measure the liquid as drawn a measuring-scale, *a*, is applied to this standing fountain.

The pump has a spigot or a spout, *b*, with a valve or stop-cock, *c*, to draw off the liquid from the standing fountain as required.

Under the spigot or spout is a sink or drip-receiver, D, to catch any drip or waste of the liquid, and it may serve to support the vessel into which the liquid is being drawn. This sink or drip-receiver is constructed so as to convey and return the drip to the tank or reservoir A. It may extend all around the pump, so that if the standing fountain should overflow it may catch the liquid and prevent waste.

A filter, E, is employed, through which the drip liquid returned to the tank or reservoir passes, in order to exclude all dirt and motes.

A filter, G, also is placed at the bottom of the pump in the tank or reservoir to filter the liquid when pumped therefrom, in case there may be impurities in the liquid.

A suitable cover, *d*, may be used to cover the standing fountain and other parts of the apparatus.

What I claim as my invention, and desire to secure by Letters Patent, is—

1. The standing fountain C at the top of the pump B, in combination with the pump, the tank or reservoir A, and sink or drip-receiver D, for the purpose herein specified.

2. The filters E and G, in combination with the sink or drip-receiver D and the pump B, for the purpose set forth.

The above specification signed by me this 14th day of October, 1870.

ELI F. WILDER.

Witnesses:
J. S. BROWN,
D. J. BROWN.